UNITED STATES PATENT OFFICE.

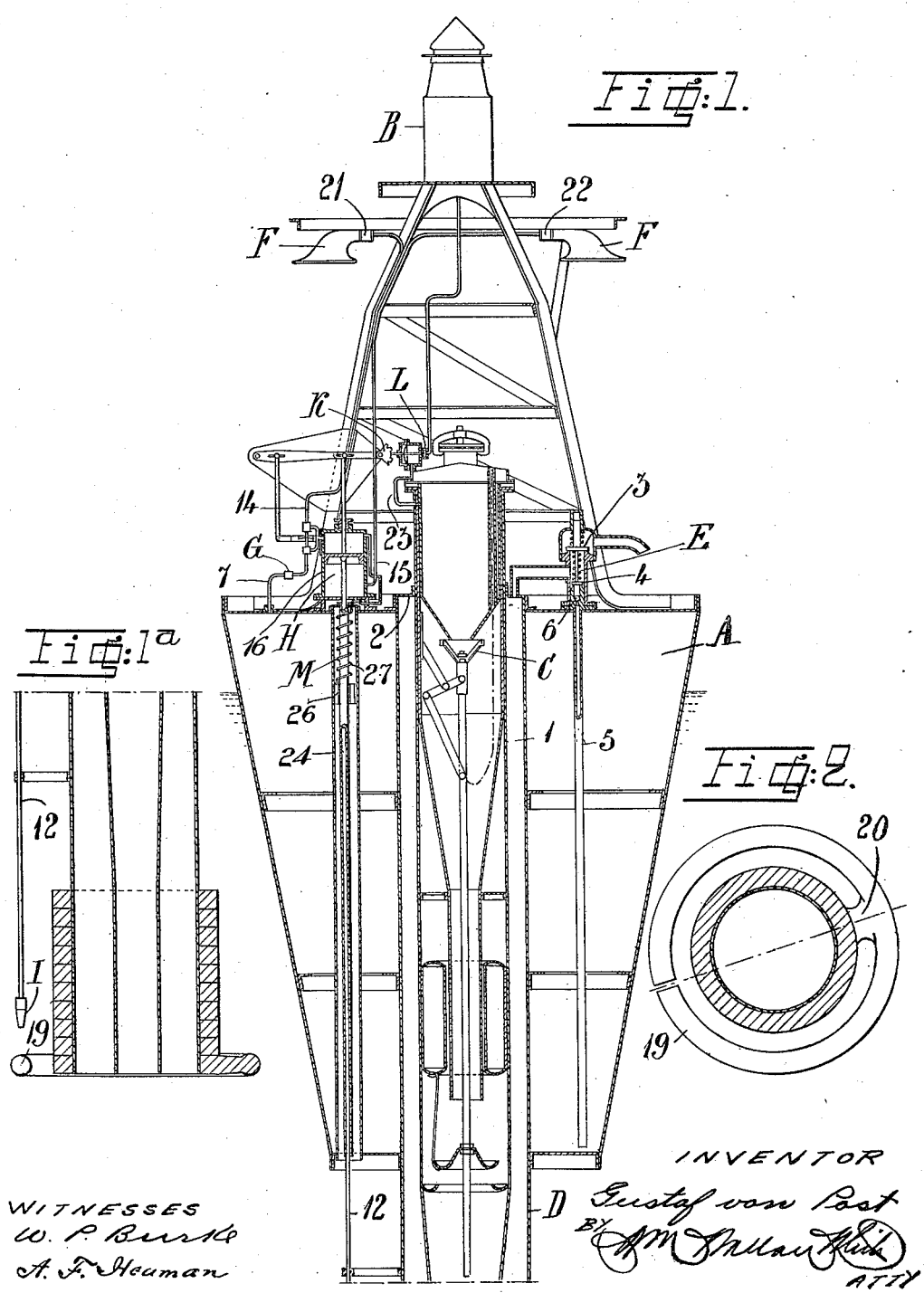

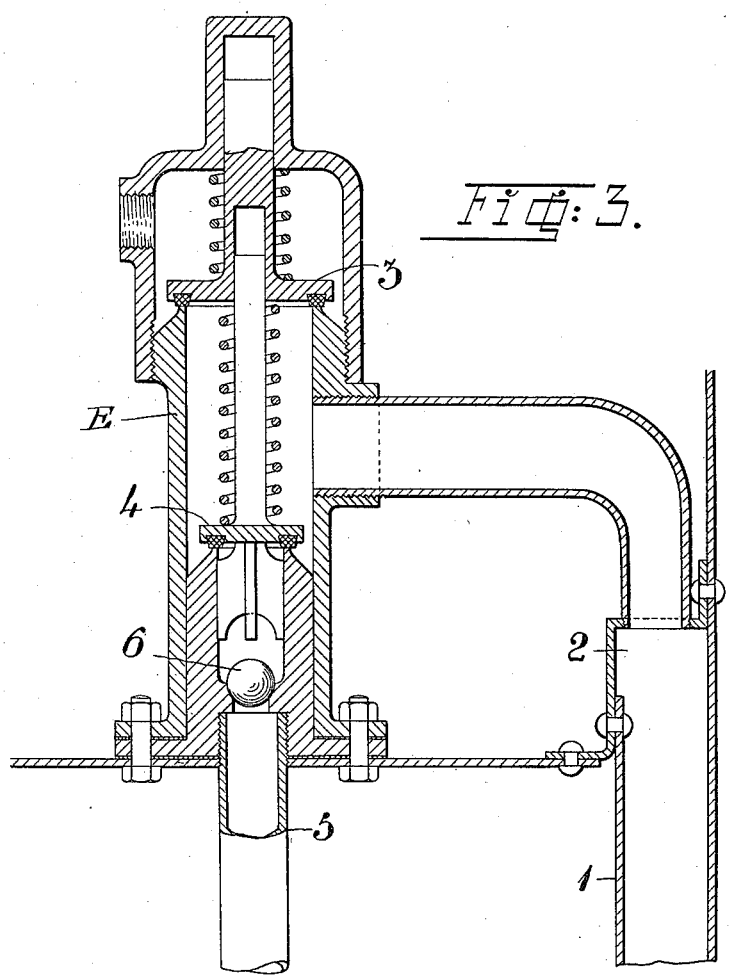

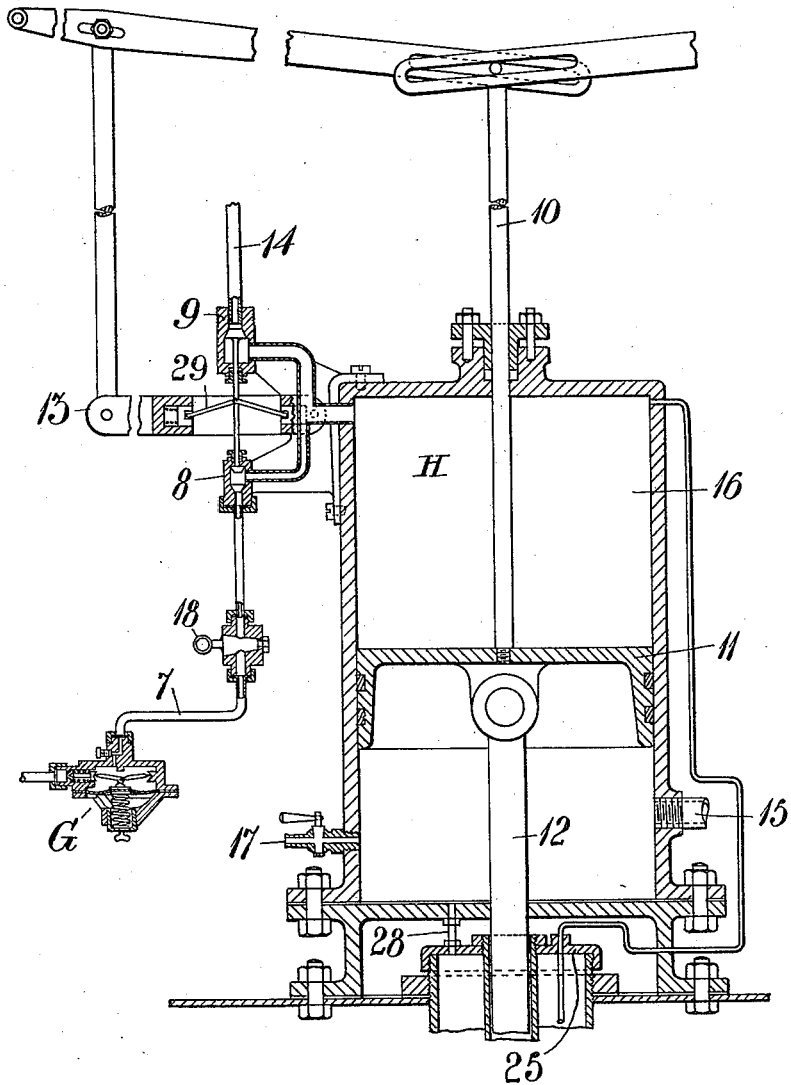

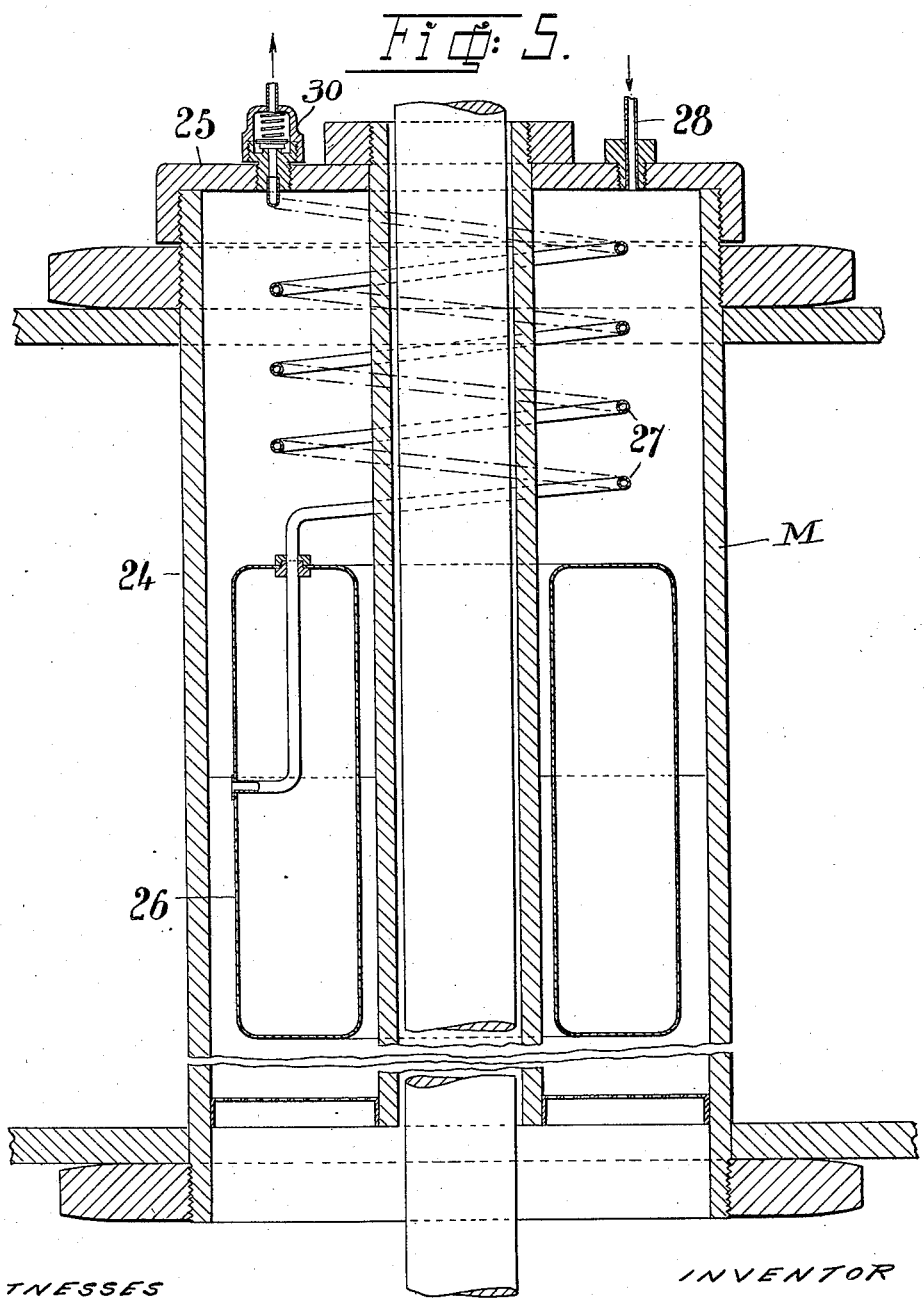

GUSTAF von POST, OF STOCKHOLM, SWEDEN.

VACUUM-GENERATING WAVE-MOTOR.

1,009,260.  Specification of Letters Patent. Patented Nov. 21, 1911.

Application filed December 11, 1909. Serial No. 532,661.

*To all whom it may concern:*

Be it known that I, GUSTAF VON POST, mechanical engineer, a subject of Sweden, residing at 11 Handtverkaregatan, Stockholm, Sweden, have invented new and useful Improvements in Vacuum-Generating Wave-Motors, of which the following is a specification.

The general idea of utilizing the energy produced by the wave motion on open water is well-known and applied to various purposes. The said idea has also been utilized for the purpose of producing characteristic warning signals on sea, but without any remarkable success on account of the constructional character of the apparatus used. The principles hitherto known for utilizing the mechanical energy generated by floating bodies on account of the wave motion have been either to cause the said energy directly to operate certain machines or to cause it to compress air, *e. g.* for producing sound signals.

According to the present invention, the energy produced by the floating bodies on account of the wave motion is transformed into pressure difference in the form of vacuum, which can be utilized directly or after maintaining in large receptacles. This method offers great advantages in comparison with other methods, which advantages will be clearly set forth in the present specification. These advantages are principally the following: (1) A vacuum is easier to obtain than an air compression of a corresponding efficiency; (2) valves and other apparatus will be more simple and safe in their function; (3) the dead spaces are considerably reduced.

The invention is illustrated in the accompanying drawing.

Figures 1 and 1ª show a buoy in a vertical section, Fig. 2 the lowest part of the same in a horizontal section, while Figs. 3, 4 and 5 show details, partly in section, of the members characteristic to the invention.

A is a hollow body floating on the water and carrying a tube D, a valve mechanism E (Fig. 3), a vacuum reducing device G, a motor H (Fig. 4), and finally a lubricating device M (Fig. 5). The said buoy operates in the following manner: In the tube D an annular chamber 1 is situated, being open at its lower end and closed at the upper end by a cover 2, except for the valve 3, the water rising in the said chamber to the same height as the water line outside of the buoy, when no wave motion occurs. When the buoy sinks between two waves, the body A, being of tapered form with the smallest diameter at the bottom, will sink with a speed somewhat in excess of that of the wave motion, while the water column inclosed in the chamber 1 or in the whole tube D (which can be made in the shape of a cylinder or of an erect cone) receives an accelerated motion upward, the speed of said motion being greatest at the moment, when the buoy has sunk to the lowest point between two waves, on account of the external shape of the body A and the shape of the tube D. By this reason, the inclosed water column will continue its upward motion even after the buoy has ceased to sink, if no resistance is offered, and therefore rise to a higher level than that of the water outside. For reducing the resistance against the said rising of the water a valve 3 with a large passage area is inserted for permitting the escape of the air quantity above the water column in the chamber 1. When the buoy is lifted on the waves the conditions will be the contrary of those just mentioned, the motion of the buoy being first accelerated and then retarded, while the inclosed water column will sink suddenly and with a great force as shown by experience producing an amount of energy which will be much greater than that corresponding only to the difference of level occurring at the oscillatory motion of the buoy. Thus a vacuum is produced, which causes the valve 4 to open, so that a quantity of air is drawn out of the body A. The valve 4 is provided with a downwardly projecting tubular extension 5, the end of which lies in close proximity to the bottom of the body A and contains another valve 6. The tube 5 and the valve 6 form safety devices against leakage, the former against leaking of the body A and the latter against leaking of the valve 4. If the leak occurs on the body A, the water will enter rapidly and endeavor to sink the buoy, but on account of the tube 5 the said water would be pumped out at the movements of the buoy. If, on the other hand, the valve 4 should be leaky, the danger of filling the buoy with water would also be great, because a suction analogous to that occurring in a siphon would act upon the water inclosed in the tube D toward the tube 5, but leakage is prevented by the valve 6.

From the upper part of the body A a pipe 7 leads to a vacuum reducing device G and further to a motor H, which can be constructed in any suitable manner with valve or slide mechanism so as to be operable by means of vacuum. In the drawing (Fig. 4), it is shown as a piston engine, provided with valves 8, 9 operated by the piston rod 10 so as to control the length of the stroke of the piston 11. When the valve 8 is opened, the piston 11 is drawn upward together with the rod 12. When the said motion has proceeded to a certain height, the valves 8 and 9 are reversed by means of the toggle joint 29, so that the atmospherical air is admitted through valve 9 and pipe 14. The rod 12 will then fall by gravity, and the air beneath the piston 11 is simultaneously exhausted through the pipe 15 under a pressure caused by the said action of gravity. The pipe 15 opens at some distance from the bottom of the cylinder 16, whereby the piston is cushioned by air after passing the mouth of the said pipe. The said cushioning is controlled by means of a cock 17. The admission of air from the engine cylinder to the vacuum receptacle is controlled by the cock 18.

An engine of the kind herein described can hardly be operated without lubrication. A suitable, automatic lubricating device M for the same is shown in detail in Fig. 5. A tube 24, containing oil and covered by a cap 25, passes through the floating body and embraces a float-gage 26, connected to a piping 27 which opens beneath the "oil-level-line" of the float-gage and is connected to the cylinder 16. As the tube 24 is tightly closed by the cap 25, the liquid-column inside the same (the upper part of which consists of oil and the lower of water will follow the movements of the buoy and thus be comparatively stationary in relation to the said buoy. By making the pipe 27 spirally wound it will be sufficiently flexible to permit the float-gage to float constantly on the oil. Each time the piston 11 is lowered in the way described before, a quantity of oil is drawn up by the suction produced and then prevented from flowing back by a valve 30. The waste oil is pressed down and back to the tube through the pipe 28. The oil thus circulating becomes well strained and the consumption is small.

The arrangement now described thus embodies a means for automatically utilizing the energy produced by the oscillating movements of the buoy by means of vacuum, and in the said embodiment the vacuum is produced inside the floating body proper. As already mentioned, the invention, however, is not limited to the example described and disclosed, the vacuum being not necessarily transmitted from the tube or receptacle D open toward the water to a closed receptacle for being stored; the said tube or receptacle (D) may on the contrary be directly connected through a valve with an engine, a signaling device or the like capable to be operated by vacuum. The utilization of the power may also take place in another manner than by the engine shown in the drawing.

The general principle of the invention is to utilize the energy produced by a floating body on account of the wave motion by forming a vacuum in receptacles of sufficient volume so as to deliver energy to a certain extent even during such intervals, when the wave movements decrease or cease.

Having now particularly described and ascertained the nature of my said invention and in what manner the same is to be performed, I declare that what I claim is:

1. In a device of the class described, in combination, a buoyant hollow body, a tube operatively associated therewith, said tube having its upper end closed and its lower end open whereby water may enter within said tube, conduits extending from said tube and communicating with the interior of said hollow body and with the outer air, and normally closed valve mechanism responsive to the compression and rarefaction of air within said tube for placing it in communication with the outer air and with the interior of said hollow body respectively.

2. In a device of the class described, in combination, a buoyant hollow body, a tube operatively associated therewith, said tube having its upper end closed and its lower end open whereby water may enter within said tube, conduits extending from said tube and communicating with the interior of said hollow body and with the outer air, a normally closed valve adapted to be operated by compression of the air within the tube to place the tube in communication with the outer air, and a normally closed valve adapted to be opened by rarefaction of air within said tube to place said tube in communication with the interior of said hollow body whereby air will be drawn therefrom.

3. In a device of the class described, in combination, a buoyant hollow body, a tube operatively associated therewith, said tube having its upper end closed and its lower end open whereby water may enter within said tube, conduits extending from said tube and communicating with the interior of said hollow body and with the outer air, a normally closed valve adapted to be operated by compression of the air within the tube to place the tube in communication with the outer air, and a normally closed valve adapted to be opened by rarefaction of air within said tube to place said tube in communication with the interior of said hollow body whereby air will be drawn therefrom, and a motor responsive to the rarefaction of air within said hollow body.

4. In a device of the class described, in combination, a buoyant hollow body, a tube operatively associated therewith, said tube having its upper end closed and its lower end open whereby water may enter within said tube, conduits extending from said tube and communicating with the interior of said hollow body and with the outer air, and normally closed valve mechanism responsive to the compression and rarefaction of air within said tube for placing it in communication with the outer air and with the interior of said hollow body respectively, and means preventing water from entering the hollow body.

5. In a device of the character described, in combination, a buoyant hollow body, means operatively associated therewith and responsive to the action of the waves for causing a rarefaction of the air within said body, a motor responsive to the rarefaction of air within said body, said motor comprising a cylinder and a piston reciprocatingly mounted therein, a receptacle adapted to contain oil, a float-gage therein, a flexible pipe through which the oil is adapted to pass from the receptacle to said cylinder, said pipe having one end connected to said float-gage and communicating with the oil in said receptacle and having its other end communicating with one end of said cylinder and a pipe extending between the other end of said cylinder and said receptacle through which the oil is adapted to pass from said cylinder to said receptacle.

In testimony whereof I have signed my name to this specification in the presence of two subscribing witnesses.

GUSTAF von POST.

Witnesses:
H. TOLANDER,
BIRGER NORDFELDT.

---

Copies of this patent may be obtained for five cents each, by addressing the "Commissioner of Patents, Washington, D. C."